March 24, 1970     J. SAWARSKI ET AL     3,502,235

SHOCK ABSORBING DEVICE FOR A BUCKET LOADER

Filed June 1, 1967     2 Sheets-Sheet 1

INVENTORS
JERZY SAWARSKI,
ZBIGNIEW GĘBICKI,
ZBIGNIEW RACZKA,
JOZEF PALIK,
PAWEŁ WACŁAW

BY Stevens, Davis, Miller & Mosher

ATTORNEYS

United States Patent Office 3,502,235
Patented Mar. 24, 1970

3,502,235
SHOCK ABSORBING DEVICE FOR A BUCKET LOADER
Jerzy Sawarski, Gliwice, Zbigniew Gebicki, Tarnowskie Gory, Zbigniew Raczka, Zabrze, Jozef Palik, Tarnowskie Gory, and Pawel Waclaw, Zabrze, Poland, assignors to Zaklady Konstrukcyjno Mechanizacyjne Przemyslu Weglowego, Luzycka, Poland
Filed June 1, 1967, Ser. No. 642,971
Claims priority, application Poland, June 10, 1966, P 115,027
Int. Cl. E02f 3/68, 3/82; B66f 9/00
U.S. Cl. 214—131       1 Claim

ABSTRACT OF THE DISCLOSURE

An arrangement for coupling a shock absorbing device to a chain operated beam which rotates the bucket of a front end loader and comprising spring loaded slides slidably mounted on pins adjacent the ends of the beam and moved therealong by nose members fixedly protruding from the beam. The biasing force of the springs on the slide may be adjusted by means of a nut.

---

Figure 1:
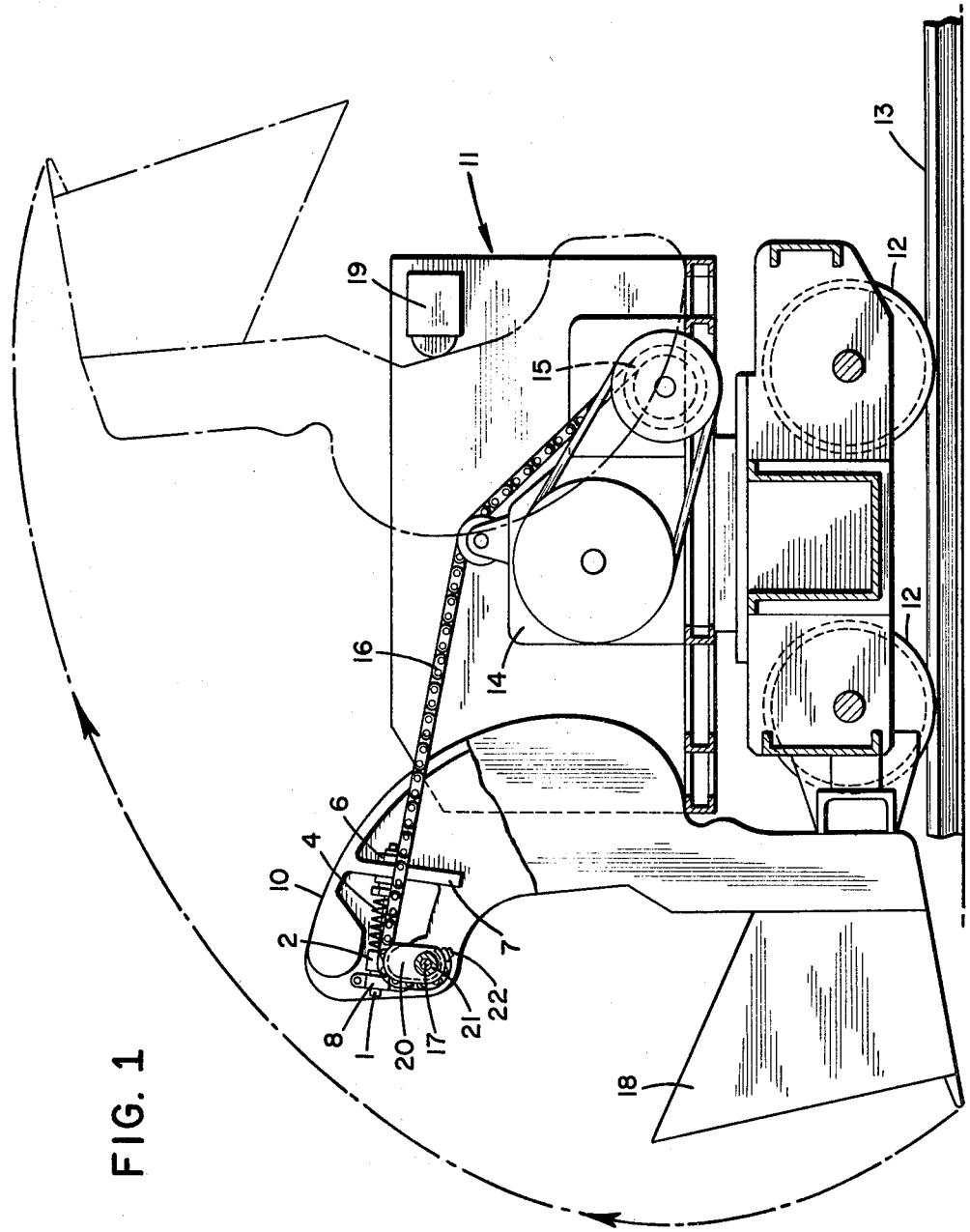

The invention relates to an arrangement for coupling the shock absorber with the chain beam and to controlling the spring tension in bucket loaders.

In known machines the bucket of the loader, fitted in two rockers, is lifted by an articulated chain with one end attached to the chain beam connecting both rockers. The opposite end of the chain is attached to a drum. The drum is rotated by a motor to reel in the chain. In the course of lifting the bucket from a loading position to the upper end of its movement, when the rockers strike against limiting bumpers which cause the load to be thrown backwards, there are jerks which cause the development of high dynamic forces in the chain and which frequently cause the chain to break.

In most loaders a rigid connection of the chain beam with the rockers is used and does not act to lower the forces acting in the chain. In some designs, however, shock absorbers are applied in order to lower said forces. In these designs, on each end of the rotatably born chain beam, a nose is provided. These noses are fitted in suitable recesses of the slides, which are component members of two separate spring shock absorbers. On each rocker one shock absorber is arranged. In the course of operation the forces acting in the chain actuate the rotation of the chain beam, and also the cooperating noses. The rotation of the noses causes a displacement of the slides which subsequently affects the deflection of the springs, depending on the preliminary tension of the springs and the greater it is the higher is the force acting in the chain.

A disadvantage of the known design of the coupling of the shock absorber with the chain beam, is that it is not possible to regulate the tension of the spring. For this reason the springs are not tensioned or weakly tensioned, and thus cause a quick arising of excessive play in the system of the shock absorber and diminish the excess of the dynamic force below the magnitude required for efficient pulling of the bucket. If the springs are tensioned too strongly, this restricts or eliminates the shock absorbing effect. If the springs are not additionally tensioned to what is required in operation (owing to an irregular variation of the scale of both springs during their operation) chain breakage will result.

In this design the slides of the shock absorbers, being affected by the springs, take a fixed position determined by the position of supporting bearings fitted to the rockers by means of screws. This causes problems of proper and equal positioning of slides in relation to both noses of the chain beam, the result of which is that the springs are not equally tensioned, the forces acting in the springs during their operation are different thus causing the assembly of rockers to tend to take a skew position during its operational motion.

The invention consists of regulation of coupling in the bucket loader, i.e. the regulation of the position of the slide and of the tension of the spring in each shock absorber cooperating with the noses placed on both ends of the chain beam. This insures that equal forces act in both springs and eliminates the possibility of a skew positioning of the assembly of the rockers.

The regulation of the position of the slide is accomplished by forced shifting of the slide along the pin which rotates in a threaded sleeve. The regulation of the tension of the spring is by means of screw adjustments which have not previously been applied to loaders.

Figure 2:
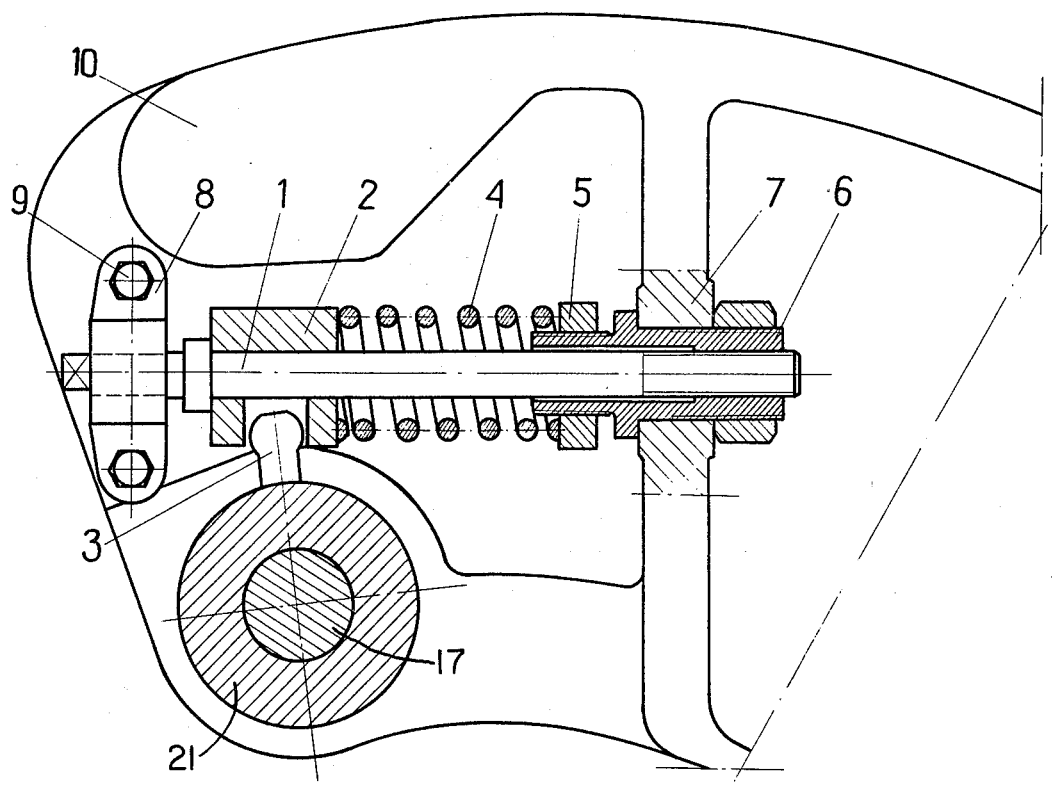

The arrangement according to the invention is shown in the accompanying drawings in which:

FIG. 1 is a longitudinal partial section of a loader embodying the invention; and FIG. 2 is a detailed drawing of the invention.

FIG. 1 shows a front end loader 11 mounted on wheels 12 riding on track 13. Within the machine is a motor 14 which drives a drum 15 to which one end of a chain 16 is fastened. The other end of the chain is connected through a rotatable shaft 17 to the ends of a pair of rocker arms 10 which in turn support the bucket. When the motor is operated and the chain is wound on the drum, the bucket is brought over to the position shown in dotted lines, striking against bumper 19. This causes a large shock force in the chain 16 and it is desirable to cushion or dampen this force in order to prevent breaking of the chain and this is the purpose of the present invention, to prevent chain breakage in such a machine.

The shaft 17 runs between the two rocker arms 10 and approximately midway along its length has a lever arm 20 and sleeves 21 to which the chain is secured by means of a bolt 22. Movement of the chain causes slight rotation of the shaft and there is a shock absorber of the present invention at each end of the shaft where it connects with the rocker arm.

Referring to FIG. 2, on a pin 1 there is fitted a slide 2, in the recess of which there enters one nose 3 of two noses which are mounted on the chain beam. The rotation of the chain beam is affected by jerks of the driving chain in turn causing a longitudinal shifting of the slide 2, which is cushioned by a spring 4. The forces acting in the spring are transmitted through the nut 5 and the sleeve 6 into the fixed bearing 7 cast together with the rockers 10. The pin 1 is screwed into the sleeve 6 and its opposite end is guided by the supporting bearing 8, attached to the rocker with screws 9.

The described arrangement according to the invention enables the travel of the slide 2 along the pin 1, as well as the operational controlling of travel in both shock absorbers cooperating with the chain beam. The regulation of the position of the slide 2 and its travel along the pin 1 is performed by means of screwing the pin 1 into or out of the sleeve 6. The regulation of the tension of the spring 4 is performed by means of screwing the nut 5 out or off of the sleeve.

What we claim is:

1. In a bucket loader having two rocker arms supporting a bucket at one end and supporting at the other end a rotatably mounted shaft having one end of a chain secured near its midpoint, the other end of said chain being connected to a power rotatable drum so that rotation of said drum causes upward movement of said bucket, the improvement comprising a shock absorber at each end of said shaft, said shock absorber having a sleeve secured to said rocker arm, a pin threadably engaged in said sleeve, a spring around said pin resiliently biasing a slide member, a nut to adjust the tension of said spring, an opening in said slide member receiving a nose protruding from said shaft so that rotation of said shaft is controlled by longitudinal movement of said spring over said pin.

References Cited

UNITED STATES PATENTS

| | | | |
|---|---|---|---|
| 2,752,053 | 6/1956 | Schwartz et al. | |
| 2,922,536 | 1/1960 | Schwartz et al. | |
| 772,119 | 10/1904 | Ahlrin | 16—185 |
| 1,822,326 | 9/1931 | Sykes | 16—80 XR |
| 2,035,823 | 3/1936 | Moore | 16—185 |
| 3,057,496 | 10/1962 | Garske | 214—140 |

ROBERT E. PULFREY, Primary Examiner

C. D. CROWDER, Assistant Examiner

U.S. Cl. X.R.

267—1